(12) United States Patent
Leung et al.

(10) Patent No.: US 7,189,074 B2
(45) Date of Patent: Mar. 13, 2007

(54) METHOD AND PROCESS FOR CO-COMBUSTION IN A WASTE TO-ENERGY FACILITY

(75) Inventors: Ching Chiu Leung, Tuen Mun (HK); Khine Aung, Tai Po (HK); Wai Man Cheung, Kwun Tong (HK)

(73) Assignee: Green Island Environmental Technologies Company Limited, Hong Kong (HK)

(*) Notice: Subject to any disclaimer, the term of this patent is extended or adjusted under 35 U.S.C. 154(b) by 494 days.

(21) Appl. No.: 10/203,245

(22) PCT Filed: Feb. 5, 2001

(86) PCT No.: PCT/GB01/00420

§ 371 (c)(1),
(2), (4) Date: Nov. 4, 2002

(87) PCT Pub. No.: WO01/59366

PCT Pub. Date: Aug. 16, 2001

(65) Prior Publication Data

US 2005/0039638 A1  Feb. 24, 2005

(30) Foreign Application Priority Data

Feb. 8, 2000 (GB) ................. 0002871.2

(51) Int. Cl.
*F27B 15/00* (2006.01)
*F27B 27/02* (2006.01)
*C04B 2/10* (2006.01)

(52) U.S. Cl. .............. 432/14; 432/58; 432/106; 106/745

(58) Field of Classification Search .......... 432/14, 432/58, 106; 106/745
See application file for complete search history.

(56) References Cited

U.S. PATENT DOCUMENTS 3,887,388 A * 6/1975 Christiansen ........... 106/747
3,923,536 A * 12/1975 Kobayashi ............. 106/747
4,260,421 A * 4/1981 Brown et al. ........... 106/758
4,640,681 A 2/1987 Steinbiss et al.
4,678,514 A 7/1987 Deyhle et al.
4,797,091 A 1/1989 Neumann
4,931,211 A * 6/1990 Martenson et al. ...... 252/378 R
5,259,876 A * 11/1993 Enkegaard ............ 106/761
5,907,818 A 5/1999 Hebisch et al.
6,030,448 A * 2/2000 Kreft et al. ........... 106/739
6,902,714 B2 * 6/2005 Skaarup Jensen et al. ................. 423/244.09

FOREIGN PATENT DOCUMENTS

| DE | 2 405 677 | * 8/1974 |
| DE | 3537595 | 4/1987 |
| DE | 3537595 A | 4/1987 |
| WO | WO 9803250 A | 1/1998 |

* cited by examiner

*Primary Examiner*—Elizabeth D. Wood
(74) *Attorney, Agent, or Firm*—Townsend and Townsend and Crew LLP

(57) ABSTRACT

The co-combustion process may comprise the following unit operations: routing of hot gas (10) generated in the clinker cooling process to a rotary kiln (1); use of part of the rotary kiln exhaust gas to dry solid wastes in rotary dryers; leading the gases from both the dryer and the combustion kiln to the secondary combustion chamber (2); use of additional fuel to boost up the secondary combustion chamber reaction temperature to as high as 1200° C.; primary dry gas scrubbing in a precalciner or precalciners (3, 3*a*); heat recovery (4) and power generation; secondary gas scrubbing (5) in a semi-dry scrubber; bag filtering after activated carbon injection and returning of all the collected ash and used carbon into the waste kiln and/or a cement kiln. Detrimental materials for cement processing generated by waste combustion can be by-passed to a scrubbing system and a cement kiln. Residue slag from waste kilns can be treated and reused.

12 Claims, 1 Drawing Sheet

METHOD AND PROCESS FOR CO-COMBUSTION IN A WASTE TO-ENERGY FACILITY

BACKGROUND OF THE INVENTION

1. Field of the Invention

The present invention relates to a method of integrating the cement production process with mass burn technology by way of merging the hot gas evolved from the cement kiln into a mass burn system typified by incineration of municipal solid waste and industrial wastes in a rotary kiln.

2. Description of the Related Art

Even as society progresses economically and socially there is still a price for everything and among these are the huge prices incurred for waste disposal. Along with the higher standards of living the amount of waste requiring disposal have been increasing at an alarming rate especially in developed countries. Although measures have been in place including source reduction and recycling to reduce waste generated by a community, a major portion of the waste still needs to be disposed of in landfills and incineration. Waste incineration plants have been widely accepted and waste burning in cement kilns is also gaining increasing favour worldwide as an important waste management option. Advanced pollution control technology has also ensured that emission levels are maintained well below regulatory limits for public acceptance of these plants.

In a conventional (or dedicated) incineration plant the waste is burnt at a relatively low temperature and emissions originating from the waste are comparatively high in toxic levels. In a cement kiln burning waste as an alternative fuel, waste is introduced directly into the cement kiln where it is utilised as a fuel substitute and an additional source of energy. The present invention involves integration of the existing cement production process with the mass burn process in a new co-combustion process.

The cement manufacturing process is a series of energy intensive unit operations which are characterised by high temperature, long residence time, natural alkaline environment, minimum amount of waste generated and high thermal capacity. The main raw material used in the manufacture of cement is a well defined mix of Limestone, Copper Slag, Silica and Fly Ash. The raw mix as it is called is crushed in a grinding mill to achieve the required fine powder which is called the raw meal which is then homogenised and fed from the top of the preheater system—a string of cyclones arranged in stages. In this four stage preheater system the raw meal is heated up step-wise in a rising counter current stream of hot gas. The hot gas is generated by the burning of coal fuel at the firing end of the rotary kiln. In an intermediate process the raw meal is heated up to 900° C. to the calcination point of Limestone in a reactor named as Precalciner. After calcination is completed the raw meal is discharged into the feed end of the rotary kiln and heated up further. In the rotary kiln chemical and mineralogical changes take place as the material passes through further heating zones of calcining, transition, sintering and cooling. Sintering zone can reach up to temperatures of 1500° C. before the material is discharged as a semi-product called clinker. The clinker is then cooled in a grate cooler followed by cooling in a G-cooler. The cooled clinker is then mixed with gypsum and after a final grinding and separation process the cement product is obtained.

The mass burning process consists of incinerating unprocessed solid waste and thereby releasing its heat energy. The waste is burnt in a furnace wherein the bulk volume of waste is reduced. After the combustion process is completed the residue is discharged into a slag handling system. The hot gas from the combustion process is passed through a waste heat boiler where the gas is cooled down and steam is generated. Energy is recovered by passing the steam through a turbine and generation of electricity. The cooled gas is then passed into a flue gas treatment system in which pollutants are removed.

The inventor has recognised, according to the present invention, that the production of cement involves intensive combustion at high temperature and that most of the hot gas streams could be utilised for heat recovery and that the hot gas from the cement clinker coolers could be diverted and merged into a waste incinerator. The inventor has concluded that a co-combustion process can ensure destruction of dioxins to lower than the existing air emission regulation limit of 0.033 ng/Nm$^3$ by optimum utilisation of the 3-Ts for combustion namely Temperature, Turbulence and Time:

Temperature—Incinerators are used extensively for mass burning because of the extremely high combustion efficiency and burnout in the kiln and have demonstrated high destruction and removal efficiency. At temperatures above 950° C. and up to 1200° C., complete destruction of the organic constituents of the fuel is obtained.

Turbulence—Turbulent mixing, which does not occur in a moving grate incinerator, gives the rotary incinerator a very high thermal efficiency in the recovery of heat from the waste feed material.

Time—Due to the length of the incinerator and the configuration of the secondary combustion chamber, longer retention time is ensured for reaction and complete burn out.

SUMMARY OF THE INVENTION

An object of the present invention is to integrate the cement production process with mass burn technology for solid waste wherein the hot gas stream from the clinker cooling process is merged with the municipal solid waste or industrial waste incineration system in a newly developed co-combustion process.

To achieve the above object the co-combustion process can involve, inter alia, the following means:
1. Cement Process System
2. Waste Reception and Handling System
3. Waste co-combustion System
4. Dry Scrubbing (New Precalciner) System
5. Power Generation System
6. Secondary Scrubbing System
7. Flue Gas and Ash Treatment System The invention provides a process for co-combustion integrating the production of cement and the incineration or combustion of municipal solid waste wherein a gaseous or solid product or by-product of one of the processes is used in the other process, the process comprising one or more of the following:

(i) the combustion or incineration takes place in a rotary incinerator or kiln and a secondary combustion chamber and flue gases from the secondary combustion chamber are routed to a precalciner of the cement production process, (ii) acidic gases in the flue gases from the combustion or incineration process are removed in the precalciner of the cement production process, which acts as a dry scrubber, (iii) combustion air for the incineration is derived at least in part from hot air from a cement clinker cooler of the cement production process,
(iv) waste is combusted or incinerated in a rotary incinerator or kiln and the resultant material is passed to a secondary combustion chamber which is operated at a temperature of from 1050° C. to 1200° C. for a retention time of not less than 4 seconds.

In a particular embodiment the waste is incinerated in a rotary incinerator and the resultant material is passed to a secondary combustion chamber which is operated at a temperature of from 1050° C. to 1200° C. for a retention time of not less than 4 seconds. That is, step (iv) is essential in this embodiment of the invention. Preferably, precursors for dioxin formation are removed from the flue gases in the secondary combustion chamber.

In another embodiment, the incineration takes place in a rotary incinerator, and a secondary combustion chamber and flue gases from the secondary combustion chamber are routed co a precalciner of the cement production process. Desirably acidic gases in the flue gases from the incineration process are removed in a precalciner of the cement production process, which acts as a dry scrubber. Preferably also combustion air for the incineration is derived at least in part from hot air from a cement clinker cooler of the cement production process. Preferably slag produced in the incineration process is used in the cement production process.

In the present invention hot gas can be taken from the exhaust system of the grate cooling system for clinker in the Cement Process System. In the grate cooling system the hot clinker discharging, typically at about 1400° C., from the cement rotary kiln may be cooled on an array of reciprocating grates by means of air from cooling air fans. The hot gas exiting from the cooler, typically at a temperature of about 240° C., can be merged into the rotary incinerator in which solid waste is burnt.

In the Waste Reception and Handling System, waste received from the waste transfer stations is typically collected in a central reception area. The waste from the waste collection vehicles is tipped into a large bunker from where it can be conveyed by grabs into a shredder. Ferrous materials can be recovered by magnetic separators prior to feeding into incinerators. The waste is then fed into the incinerator where it undergoes a high temperature combustion process.

The Waste Co-combustion System may consist of 6 to 8 kilns followed by the same number of secondary combustion chambers. The kilns can perform the drying, combustion, and melting the ash residue into slag. The secondary combustion chambers are typically designed to provide a high temperature (e.g. about 1200° C.) environment and a gas retention time of not less than 4 seconds to ensure the complete destruction of all the organic matters. Each kiln and combustion chamber may be equipped with its own coal and/or oil burners to ensure the required operational temperatures can be attained.

Shredded waste fed into the drying section of the kiln can tumble down the combustion section. Hot slag (typically 1100° C. to 1200° C.) produced may drop into a water bath for rapid quenching. The steam explosion caused splits the slag into small particles. The split slag can then be collected ready for raw mix grinding in the cement process.

In the Dry Scrubbing (New Precalciner) System a cement precalciner can be used for dry scrubbing of the acid gases of waste co-combustion flue gases. This scrubbing process can generally achieve extremely high degree of scrubbing and acidic gas emission such as $SO_2$ can be less than 8 ppm. This is because there is more than a hundred times of the theoretically required lime dust suspended in the system 'hunting' for acidic gases. The successful removal of acidic gases, particularly hydrogen chloride, can greatly reduce the chances of reformation of dioxin in the boiler. In addition, the boiler tubes of the waste heat boiler can last much longer, thereby providing higher availability of the steam generation system. Hot gas from the secondary combustion chamber entering the precalciner can provide part of the energy required to calcinate the fine raw cement mix. The balance of the energy required may come from a Marpol oil burner, for example. The dry scrubbing process typically takes place at 900° C. to 950° C.

The Power Generation System typically comprises waste heat boilers from which the evolved steam can drive turbine generators for electricity. Electrical power generated can satisfy the entire electricity consumption of a cement plant plus the power demand of the co-combustion plant to be built. The excessive power generated can be passed into the power distribution grid. Boiler ash collected through a proper tube cleaning device may be sent to a buffer bin. It can then be recycled back to the homogenising silos of the cement process or used for preparation of lime slurry for semi-dry scrubbing.

The Secondary Scrubbing System is an added level of flue gas cleaning process which may be used in addition to the dry scrubber. The system typically consists of 3 steps:

1. Semi-dry scrubbing (SDS)—Flue gas coming out of the boiler can enter into the top section of the SDS where the gas stream is generally evenly distributed over the plane cross-sectional surface. Lime slurry can also be injected at the upper end of the SDS and travel down together with the gas stream concurrently. The dimensions of the SDS design are typically such as to ensure that there is enough retention time for reaction and drying of the slurry.

2. Activated Carbon Injection—The co-combustion process proposed is intended to convert completely the chemical precursors for the formation of dioxins and furans into combustion products, i.e. carbon dioxide and water. However, under unexpected conditions such as sudden breakdown and/or malfunction of equipment, the precursors may exist and reform very small amounts of dioxins and furans inside the boiler. Injection of activated carbon can be used for further cleaning of the flue gas and forms an additional safety measure for absorption of unexpected dioxins and furans. Heavy metals can also be collected by this process.

3. Baghouse filtration—The flue gases may be passed through bag filters. The best available fabrics, such as fibre glass fabric laminated PTFE membrane, are preferably used for making the bags. This can be a self-cleaning system. Dust/ash collected can be recycled and/or destroyed at high temperature.

In the Flue Gas and Ash Treatment System useful chemicals from cement kiln by-pass gas and boiler ash can be recovered and at the same time the dioxins and furans absorbed by the activated carbon in the ash can be thermally destroyed. The flue gases can go through the scrubbing and polishing units to ensure that typically all gas emission limits are observed. Ash settled out from the kiln by-pass gas and boiler ash can be fed into a new cement rotary kiln where the ash can be turned into clinker and typically all the acidic gases can be vaporised and vented to a series of wet scrubbing units. The liquid discharged from the scrubbing units, mainly calcium chloride and calcium sulphate, may go though a series of separation unit operations so that calcium sulphate (gypsum) and/or sulphur can be separated and consumed in the cement grinding process and/or used for other industries. Calcium chloride and other alkaline compounds can also be recovered.

BRIEF DESCRIPTION OF THE DRAWING

The present invention will now be illustrated, merely by way of example, with reference to the accompanying drawing in which the FIGURE shows an embodiment of a co-combustion system according to the present invention in which the numerals attached therein are:
1. Municipal Solid Waste (MSW) and Industrial Waste incineration system
2. Secondary Combustion Chamber (SCC) for the destruction of dioxin
3. New Precalciner of cement manufacturing process and Dry Scrubbing of flue gases
3a. Existing Precalciner of cement manufacturing process and Dry Scrubbing of flue gases
4. Waste Heat Boiler
5. Flue Gas treatment system which can include semidry or wet scrubber, and dust collector
6. Stack
7. Municipal Solid Waste (MSW) and Industrial Waste feed stream
8. Preheated cement raw meal feed stream
9. Calcined cement raw meal feed stream
10. Hot Gas from cement clinker coolers

DETAILED DESCRIPTION OF THE EMBODIMENTS

Figure 1:
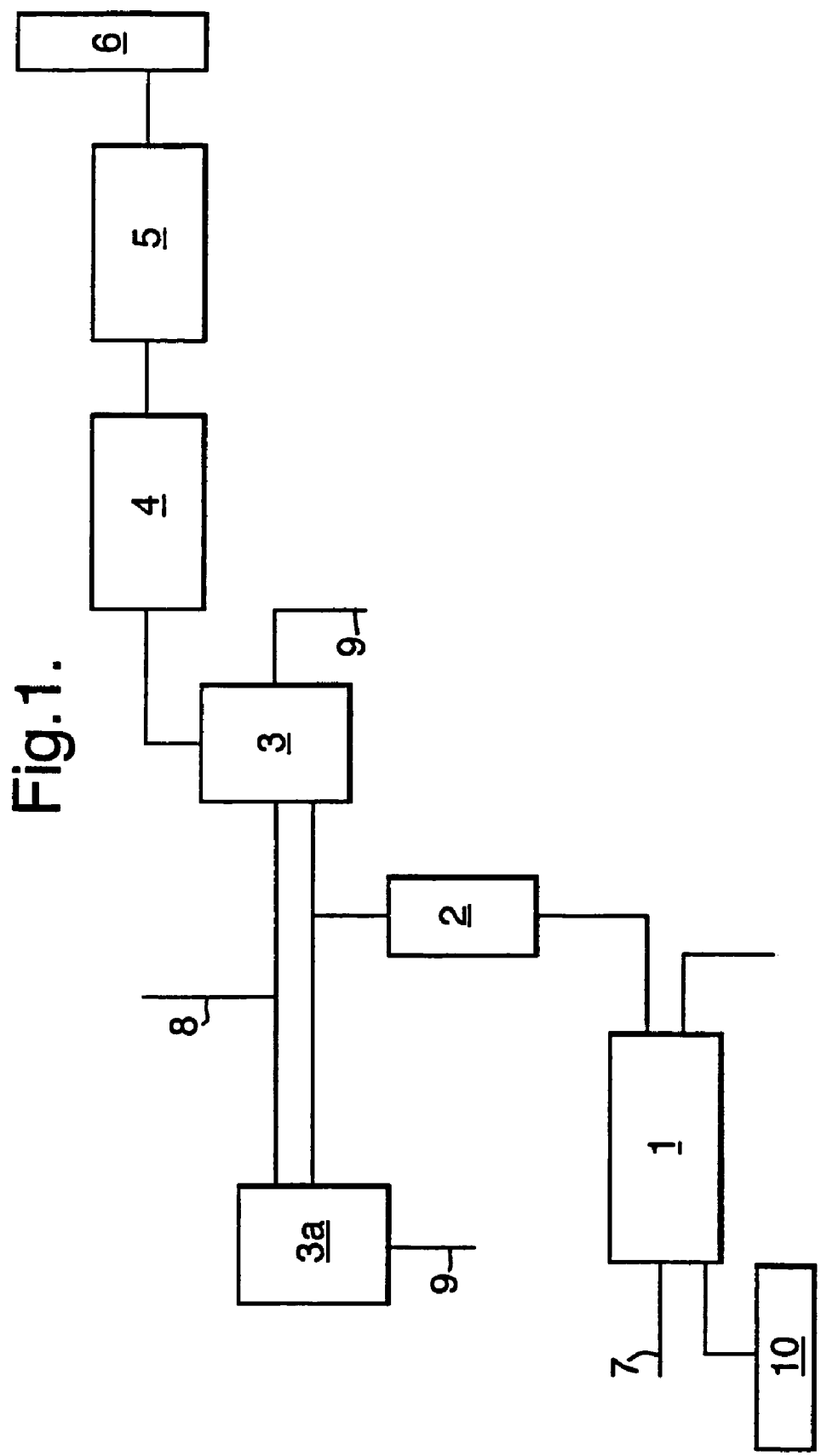

One embodiment of the co-combustion process, which is the possibility of merging hot gas evolved from the clinker cooling process into the mass burn system for Municipal Solid Waste (MSW) and industrial waste, is described below with reference to the FIGURE.

As shown by stream #7, solid waste can be fed into an incineration system comprising a rotary dryer and incinerator where drying and combustion of the solid waste can occur. A controlled amount of hot gas input typically at a temperature of about 240° C. from the cement grate cooler system can be routed into the mass burn unit as shown by stream #10.

The flue gas from the drying and incineration system (#1) can be further heated up in a Secondary Combustion Chamber (#2). The target temperature in the Secondary Combustion Chamber can be as high as 1200° C., generally by using additional fuel (coal/natural gas/oil), and this high temperature in combination with intensive turbulence and long retention time can lead to complete combustion of the organic carbons and precursors of dioxin formation.

In the embodiment illustrated in the flow diagram, the hot flue gas, typically up to 1200° C., from the secondary combustion chamber can enter a precalciner or precalciners (#3) where it may be mixed with preheated cement raw meal (stream #8) from the preheated tower of the cement process. Part of the hot flue gas from the Secondary Combustion Chamber (#2) can also be diverted to an existing precalciner of the cement production process (#3a) for dry scrubbing.

In the precalciners, the raw meal can undergo a heat exchange process with the hot flue gas, and typically at a temperature of about 890° C. the raw meal will undergo calcination—a process in which the calcium carbonate is decomposed to calcium oxide and carbon dioxide. Acidic gases such as HCl and $SO_2$ from the mass burn system can react with the calcium oxide and may be removed from the gas stream in a dry scrubbing process.

The advantage of this dry scrubbing process is the extremely high degree of scrubbing which may be achieved by the excess lime dust which absorbs and reacts with the acidic components of flue gas, removing them in the process. These acidic components can be absorbed in raw meal (Stream #9) and can be discharged into the cement rotary kiln system.

The cleaned flue gas (typically free of HCl and $SO_2$) generally at a temperature of about 850° C. can be utilised in a Waste Heat Boiler (#4), and the steam generated can be used for power generation. The expected temperature of the cleaned flue gas at the boiler outlet is generally about 400° C.

Then the cooled flue gas can enter Flue Gas treatment system (#5) which comprises air pollution control devices. The flue gas may first undergo a semi-dry scrubbing process and typically exits at a temperature of about 150° C.—this is the temperature below which there is no chance of dioxin reformation. After an optional active carbon injection process the flue gas can be passed through a bag filter where the residual gas pollutants are removed.

This down stream flue gas treatment may be used to ensure that the gas discharge through Stack (#6) can comply with emission standards as laid down by the regulatory authorities

The invention claimed is:

1. A process for integrating the production of cement clinker with the combustion of solid waste comprising:
   (a) burning said waste in a rotary kiln to generate flue gas and slag;
   (b) heating said flue gas to a high temperature in the presence of oxygen in a secondary combustion chamber, the retention time of said flue gas in said secondary combustion chamber being sufficiently long to allow substantially complete combustion of said waste and to generating hot flue gases therefrom;
   (c) transferring said hot flue gases to a cement precalciner system, said precalciner system containing cement raw meal;
   (d) calcining said raw meal at a temperature of about 890° C. in the presence of said flue gas such that acids in said flue gas are scrubbed; and
   (e) sintering said calcined raw meal to cement clinker.

2. An integrated cement manufacturing and solid waste thermo-treatment system comprising:
   (a) at least one rotary kiln adapted to receive and combust refuse;
   (b) at least one secondary combustion chamber coupled to said rotary kiln and adapted to receive flue gas generated therefrom, said chamber further adapted to heat said flue gas to a high temperature and to retain said hot flue gas for an amount of time, said high temperature and amount of time being sufficient to allow substantially complete combustion of said waste;
   (c) at least one precalciner coupled to said secondary combustion chamber and adapted to receive said hot flue gas therefrom, said precalciner further adapted to retain heat from said flue gas for heating said cement raw meal to a temperature sufficient to allow calcination of said cement raw meal;
   (d) a rotary kiln coupled to said precalciner and adapted to receive said calcined raw meal for sintering into clinker; and
   (e) a cooling system coupled to said rotary kiln for cooling said clinker received therefrom.

3. A method according to claim 1 wherein said heating step in said secondary combustion chamber is performed at a temperature in the range of 1050° C. to 1200° C.

4. A method according to claim 1 wherein said retention time of said flue gas in said secondary combustion chamber is at least 4 seconds.

5. A method according to claim 1 wherein said heating step in said secondary combustion chamber is performed at a temperature in the range of 1050° C. to 1200° C. and said retention time of said flue gas in said secondary combustion chamber is at least 4 seconds.

6. A method according to claim 1 wherein said heating step in said secondary combustion chamber is performed at a sufficiently high temperature and with sufficiently long retention time to allow removal of precursors of dioxin from said flue gas.

7. A method according to claim 1 wherein said cement clinker is further cooled, and flue gas from said cooling process is transferred to said rotary kiln to maintain the temperature of said waste burning step.

8. A method according to claim 1 further comprising producing fly ash from said calcination step, transferring said fly ash and flue gas in said precalciner to a boiler; generating thermoenergy therefrom; cooling said fly ash and flue gas; transferring said fly ash back to said precalciner for clinker production; scrubbing said cooled flue gas at about 150° C.; filtering said scrubbed flue gas; and releasing said flue gas into the environment.

9. A method according to claim 1 further comprising producing fly ash from said calcination step, transferring said fly ash and flue gas to a boiler and generating thermo-electricity therefrom; and collecting and converting said cooled fly ash to lime slurry for use in a semi-dry scrubber.

10. A process for integrating the production of cement clinker with the combustion of solid waste comprising:
(a) burning solid waste in a rotary kiln to produce flue gas and slag;
(b) transferring said flue gas directly a secondary combustion chamber;
(c) further heating said flue gas to a temperature of 1050° C. to 1200° C. in the presence of oxygen in said secondary combustion chamber under intense turbulence and for a sufficiently long retention time to allow substantially complete combustion of said waste and to generating flue gases therefrom;
(d) transferring said flue gases to at least one cement precalciner, said precalciner containing cement raw meal;
(e) calcining said raw meal at a temperature of about 890° C. in the presence of said flue gases such that acids in said flue gas are scrubbed;
(f) cooling said scrubbed flue gases to about 400° C. in a steam boiler and generating electric power therefrom;
(g) scrubbing said cooled flue gases from step (f) at about 150° C.;
(h) filtering said scrubbed flue gases from step (g);
(i) releasing said filtered flue gases from step (h) into the environment; and
(j) sintering said calcined raw meal from step (e) to cement clinker.

11. An integrated cement manufacturing and solid waste thermo-treatment system comprising:
(a) a rotary kiln adapted to receive and combust refuse;
(b) a secondary combustion chamber coupled directly to said rotary kiln and adapted to receive flue gas generated therefrom, said chamber further adapted to heat said flue gas under intense turbulence to a temperature of 1050° C. to 1200° C. and to retain said hot flue gas for a sufficient amount of time to allow substantially complete combustion of said waste;
(c) at least one precalciner coupled to said secondary combustion chamber and adapted to receive said flue gas therefrom, said precalciner further adapted to retain heat from said flue gas for heating said cement raw meal to a temperature sufficient to allow calcination of said cement raw meal;
(d) a clinker kiln coupled to said precalciner and adapted to receive said calcined raw meal for sintering into clinker;
(e) a cooling system coupled to said precalciner for cooling said flue gas received therefrom; and
(f) a flue gas treatment system coupled to said cooling system comprising a scrubbing system and a bag filter.

12. A system according to claim 11 wherein two precalciners are coupled in parallel to said secondary combustion chamber.

* * * * *

UNITED STATES PATENT AND TRADEMARK OFFICE
CERTIFICATE OF CORRECTION

PATENT NO. : 7,189,074 B2 Page 1 of 1
APPLICATION NO. : 10/203245
DATED : February 5, 2001
INVENTOR(S) : Ching Chiu Leung et al.

It is certified that error appears in the above-identified patent and that said Letters Patent is hereby corrected as shown below:

Please change the Assignee as it is to appear on the Letters Patent from Green Island Environmental Technologies Limited to Green Island Environmental Limited.
On The Title Page, Item (73)
The Assignee to appear is --Green Island Environmental Limited--

Signed and Sealed this

Nineteenth Day of February, 2008

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,189,074 B2 | Page 1 of 1 |
| APPLICATION NO. | : 10/203245 | |
| DATED | : February 5, 2001 | |
| INVENTOR(S) | : Ching Chiu Leung et al. | |

It is certified that error appears in the above-identified patent and that said Letters Patent is hereby corrected as shown below:

On The Title Page, Item (73)
Please change the Assignee as it is to appear on the Letters Patent from Green Island Environmental Technologies Limited to Green Island Environmental Limited.

Signed and Sealed this

Fourth Day of March, 2008

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,189,074 B2 | Page 1 of 1 |
| APPLICATION NO. | : 10/203245 | |
| DATED | : March 13, 2007 | |
| INVENTOR(S) | : Ching Chiu Leung et al. | |

It is certified that error appears in the above-identified patent and that said Letters Patent is hereby corrected as shown below:

Please change the Assignee as it is to appear on the Letters Patent from Green Island Environmental Technologies Limited to Green Island Environmental Limited.
On The Title Page, Item (73)
The Assignee to appear is --Green Island Environmental Limited--

This certificate supersedes the Certificate of Correction issued February 19, 2008.

Signed and Sealed this

Eleventh Day of March, 2008

JON W. DUDAS
*Director of the United States Patent and Trademark Office*

UNITED STATES PATENT AND TRADEMARK OFFICE
CERTIFICATE OF CORRECTION

PATENT NO.         : 7,189,074 B2                                        Page 1 of 1
APPLICATION NO. : 10/203245
DATED              : March 13, 2007
INVENTOR(S)        : Ching Chiu Leung et al.

It is certified that error appears in the above-identified patent and that said Letters Patent is hereby corrected as shown below:

On The Title Page, Item (73)
Please change the Assignee as it is to appear on the Letters Patent from Green Island Environmental Technologies Limited to Green Island Environmental Limited.

This certificate supersedes the Certificate of Correction issued March 4, 2008.

Signed and Sealed this

First Day of April, 2008

JON W. DUDAS
*Director of the United States Patent and Trademark Office*